United States Patent
Igelka

(10) Patent No.: US 8,937,562 B1
(45) Date of Patent: Jan. 20, 2015

(54) SHARED DATA DE-DUPLICATION METHOD AND SYSTEM

(71) Applicant: Or Igelka, Ramat Gan (IL)

(72) Inventor: Or Igelka, Ramat Gan (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/953,451

(22) Filed: Jul. 29, 2013

(51) Int. Cl.
*H03M 7/00* (2006.01)
*H04L 12/927* (2013.01)
*H04L 29/06* (2006.01)
*H04L 12/911* (2013.01)

(52) U.S. Cl.
CPC .............. *H04L 47/801* (2013.01); *H04L 67/42* (2013.01); *H04L 47/783* (2013.01)
USPC ............. 341/51; 370/400; 711/103; 711/165; 711/147; 711/216; 711/133; 382/103; 382/195; 709/203; 709/224; 709/204; 709/206; 707/678; 707/649; 707/692

(58) Field of Classification Search
CPC ... H04L 67/10; H04L 67/1031; H04L 41/883; G06F 17/30; G06F 17/3061; G06F 17/30303; G06F 7/00
USPC .......... 707/692, E17.005, E17.002, 649, 678; 709/203, 224, 204, 206; 382/103, 195; 370/400; 711/103, 165, 147, 216, 130, 711/133, 162; 341/50–90
See application file for complete search history.

(56) References Cited

U.S. PATENT DOCUMENTS

| | | | |
|---|---|---|---|
| 7,321,322 B2 | 1/2008 | Helfman et al. | |
| 8,018,866 B1 | 9/2011 | Kasturi et al. | |
| 8,190,850 B1 * | 5/2012 | Davenport et al. | ........... 711/202 |
| 8,280,926 B2 * | 10/2012 | Sandorfi et al. | ............... 707/812 |
| 8,396,929 B2 | 3/2013 | Helfman et al. | |
| 8,412,688 B1 * | 4/2013 | Armangau et al. | ........... 707/695 |
| 8,428,265 B2 * | 4/2013 | Bosson | ......................... 380/277 |
| 8,442,952 B1 * | 5/2013 | Armangau et al. | ........... 707/686 |
| 8,489,799 B2 * | 7/2013 | Factor et al. | ...................... 711/6 |
| 8,527,472 B2 * | 9/2013 | Bosson | ......................... 707/679 |

(Continued)

FOREIGN PATENT DOCUMENTS

WO WO 2010/040078 A2 4/2010
WO WO 2011/159322 12/2011

OTHER PUBLICATIONS

U.S. Appl. No. 13/362,206, filed Jan. 31, 2012, Or Igelka.

(Continued)

*Primary Examiner* — Lam T Mai
(74) *Attorney, Agent, or Firm* — Fish & Richardson P.C.

(57) ABSTRACT

This disclosure relates to synchronizing dictionaries of acceleration nodes in a computer network. For example, dictionaries of a plurality of acceleration nodes of a client-server network can be synchronized to each include one or more identical data items and data identifier pairs. Synchronization can include transmitting a particular data item, or a combination of a data item and an associated data identifier, to another acceleration node which includes it in its dictionary. A particular acceleration node can, instead of transmitting a data item, transmit an associated data identifier to another acceleration node. As all (or a subset) of the acceleration nodes can have an identical dictionary when employing the methods described herein, the particular acceleration node can use the same dictionary to communicate with all (or the subset of) other acceleration nodes of the computer network.

22 Claims, 5 Drawing Sheets

(56) References Cited

U.S. PATENT DOCUMENTS

| | | | |
|---|---|---|---|
| 8,578,128 B1 * | 11/2013 | Davenport et al. | 711/202 |
| 8,615,500 B1 * | 12/2013 | Armangau et al. | 707/693 |
| 8,671,456 B2 * | 3/2014 | Or Igelka et al. | 726/27 |
| 8,738,570 B2 * | 5/2014 | Picken et al. | 707/626 |
| 8,738,884 B2 * | 5/2014 | Factor et al. | 711/170 |
| 8,743,501 B2 * | 6/2014 | Wideman | 360/69 |
| 2002/0010797 A1 | 1/2002 | Moulton | |
| 2004/0146053 A1 | 7/2004 | Nabhan et al. | |
| 2005/0025150 A1 | 2/2005 | Helmy et al. | |
| 2009/0113412 A1 | 4/2009 | Shribman et al. | |
| 2010/0023925 A1 | 1/2010 | Shribman et al. | |
| 2010/0098092 A1 | 4/2010 | Luo et al. | |
| 2012/0089664 A1 | 4/2012 | Igelka | |
| 2012/0323864 A1 | 12/2012 | Zhu et al. | |

OTHER PUBLICATIONS

U.S. Appl. No. 13/905,910, filed May 30, 2013, Or Igelka.

U.S. Appl. No. 13/948,806, filed Jul. 23, 2013, Alex Drobinsky et al.

Communication and extened Search Report for EPO for EP Application No. 14002026.4—1857, dated Oct. 14, 2014; 7 pages.

* cited by examiner

SHARED DATA DE-DUPLICATION METHOD AND SYSTEM

TECHNICAL FIELD

The present disclosure relates to methods and systems for sharing data in a computer network including network nodes.

BACKGROUND

Modern computer network systems can be fairly complex and span large spatial distances. For instance, a central database including a server of a client-server network can be located in Europe. Different systems of a client can be located in, e.g., the U.S.A., Australia, South Africa, and other geographical locations. Such distributed systems can be the result of consolidated networks structures of globally operating enterprises. At the same time, the amount of data transmitted over these networks is steadily increasing. This can result in considerable delays, in particular on the wide area network connections. In the example described above, a client located in Australia can launch a report program, which may access the central database in Europe. This can lead to high response times as a result of network limitations such as bandwidth, latency and congestion. Furthermore, advanced communication schemes might increase the amount of data that needs to be stored at the different networks nodes and thus increases the cost and complexity of the network nodes.

SUMMARY

In a first aspect of the present disclosure, a computer-implemented method includes identifying a first acceleration node included in a computer network comprising a plurality of acceleration nodes, an acceleration node to accelerate transmission of resources between a client computer system and a server computer system connected through one or more of the plurality of acceleration nodes, the first acceleration node including a first dictionary of data items and data identifiers, each data identifier identifying a corresponding data item, and wherein an acceleration node is configured to provide data identifiers to other acceleration nodes and to identify data items based on data identifiers received from another acceleration node, receiving, at the first acceleration node and from a second acceleration node, a data item, including the data item in the first dictionary included in the first acceleration node and providing the received data item, a data identifier identifying the received data item, or both to a third acceleration node of the computer network, wherein the data identifier is either determined by the first acceleration node or obtained from another acceleration node.

In a second aspect according to the first aspect, the method further includes receiving, at the first acceleration node and from one or more further acceleration nodes, further data items and including the further data items in the first dictionary.

In a third aspect according to the first or second aspect, the method further includes determining the data identifier for a corresponding data item using a predetermined algorithm.

In a fourth aspect according to the third aspect, the predetermined algorithm comprises determining a hash value.

In a fifth aspect according to anyone of the previous aspects, the first acceleration node stores a protocol of dictionary entries including data items, data identifiers, or both in a second dictionary of the third acceleration node.

In a sixth aspect according to anyone of the previous aspects, the method further includes determining at the first acceleration node which dictionary entries of the first dictionary are missing in the second dictionary and providing from the first acceleration node the missing dictionary entries.

In a seventh aspect according to anyone of the previous aspects, the method further includes determining that a dictionary of the third acceleration node contains the data item, providing a data identifier identifying the received data item to the third acceleration node if it has been determined that the dictionary of the third acceleration node contains the data item and providing the data item to the third acceleration node if it has been determined that the dictionary of the third acceleration node does not contain the data item.

In an eighth aspect according to anyone of the previous aspects, the method further includes estimating an amount of resources and/or time it takes for the third acceleration node to determine the data identifier identifying the received data item and an amount of resources and/or time it takes to transmit the data identifier from the first acceleration node to the third acceleration node, comparing the amount of resources and/or time it takes for the third acceleration node to determine the data identifier identifying the received data item and the amount of resources and/or time it takes to transmit the data identifier from the first acceleration node to the third acceleration node, transmitting the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node and letting the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

In a ninth aspect according to anyone of the previous aspects a data identifier is provided by the first acceleration node and the method further includes receiving a data identifier of the first dictionary at the third acceleration node, determining that a dictionary of the third acceleration node does not include the data identifier, requesting, from the first acceleration node, the data item identified by the data identifier, transmitting the data item from the first acceleration node to the third acceleration node and including the received data identifier and the received data item in the dictionary of the third acceleration.

In a tenth aspect according to anyone of the previous aspects the first acceleration node regularly broadcasts at least a portion of its dictionary to one or more neighboring acceleration nodes including the third acceleration node.

In an eleventh aspect according to anyone of the previous aspects the data item is a resource to be transmitted via the first acceleration node across the computer network.

In a twelfth aspect according to anyone of the previous aspects the method further includes comparing network traffic at an acceleration node of the plurality of acceleration nodes with a predetermined threshold, determining that the network traffic at the acceleration node of the computer network is below the predetermined threshold and providing the received data item, a data identifier identifying the received data item, or both to the third acceleration node of the computer network in response to determining that the network traffic at the acceleration node of the computer network is below the predetermined threshold.

In a thirteenth aspect according to anyone of the previous aspects the method further includes generating at the first acceleration node a data item to be included in the dictionary of the first acceleration node, determining a data identifier identifying the generated data item and transmitting the generated data item or a combination of the generated data item and the calculated data identifier to the third acceleration node.

In a fourteenth aspect according to anyone of the previous aspects the method further includes determining, by the first acceleration node, a number of times a predetermined data identifier is used in communication with other acceleration nodes in a predetermined period of time, comparing the number of times with a threshold number of times and deleting a data item identified by the data identifier from the dictionary upon determining that the number of times is less than the threshold number of times.

In a fifteenth aspect according to anyone of the previous aspects the client-server network includes at least three different subsets of the plurality of acceleration nodes each subset including at least one acceleration node, wherein the first acceleration node is included in the first subset, the second acceleration node is included in the second subset, and the third acceleration node is included in a third subset of acceleration nodes, the first acceleration node including at least one additional dictionary and the method further includes providing a data identifier of the additional dictionary to another acceleration node of the first subset of acceleration nodes to identify a data item based on the data identifier of the additional dictionary.

In a sixteenth aspect according to anyone of the previous aspects the method further includes regularly synchronizing all dictionaries of all acceleration nodes of the computer network or a subset of acceleration nodes of the computer network, where after synchronization has been completed all dictionaries of the acceleration nodes of the computer network at least partially include identical dictionary entries.

In a seventeenth aspect according to anyone of the previous aspects the method further includes adding the third acceleration node to the computer network without a populated dictionary or in which a second dictionary of the third acceleration node has been partially or completely lost and building or recovering the second dictionary of the third acceleration node by receiving data from other acceleration nodes of the computer network.

In an eighteenth aspect according to anyone of the previous aspects the data item received by the first network node as part of a communication process between a server and a client.

In a nineteenth aspect a system comprises one or more processors and a computer-readable medium storing instructions executable by the one or more processors to perform operations including identifying a first acceleration node included in a computer network comprising two or more acceleration nodes, an acceleration node to accelerate transmission of resources between a client computer system and a server computer system connected through the acceleration node, the first acceleration node including a first dictionary of data items and data identifiers, each data identifier identifying a corresponding data item, and wherein an acceleration node is configured to provide data identifiers to other acceleration nodes and to identify a data item based on a data identifier received from another acceleration node, receiving, at the first acceleration node and from a second acceleration node, a data item, including the data item in the first dictionary and providing the received data item, a data identifier identifying the received data item, or both to a third acceleration node of the computer network, wherein the data identifier is determined at the first acceleration node or obtained from another acceleration node.

In a twentieth aspect according to the nineteenth aspect the computer-readable medium further stores instructions executable by the one or more processors to perform operations including estimating an amount of resources and/or time it takes for the third acceleration node to determine the data identifier identifying the received data item and an amount of resources and/or time it takes to transmit the data identifier from the first acceleration node to the third acceleration node comparing the amount of resources and/or time it takes for the third acceleration node to determine the data identifier identifying the received data item and the amount of resources and/or time it takes to transmit the data identifier from the first acceleration node to the third acceleration node, transmitting the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node and letting the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

In a twenty-first aspect a computer readable medium stores instructions thereon which when executed by a processor cause the processor to identify a first acceleration node included in a computer network comprising two or more acceleration nodes, an acceleration node to accelerate transmission of resources between a client computer system and a server computer system connected through the acceleration node, the first acceleration node including a first dictionary of data items and data identifiers, each data identifier identifying a corresponding data item, and wherein an acceleration node is configured to provide data identifiers to other acceleration nodes and to identify a data item based on a data identifier received from another acceleration node, receive, at the first acceleration node and from a second acceleration node, a data item, include the data item in the first dictionary and provide the received data item, a data identifier identifying the received data item, or both to a third acceleration node of the computer network, wherein the data identifier is determined at the first acceleration node or obtained from another acceleration node.

In a twenty-second aspect according to the twenty-first aspect the computer readable medium further stores instructions which when executed by a processor cause the processor to estimate an amount of resources and/or time it takes for the third acceleration node to determine the data identifier identifying the received data item and an amount of resources and/or time it takes to transmit the data identifier from the first acceleration node to the third acceleration node, compare the amount of resources and/or time it takes for the third acceleration node to determine the data identifier identifying the received data item and the amount of resources and/or time it takes to transmit the data identifier from the first acceleration node to the third acceleration node, transmit the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node and let the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

In a twenty-third aspect the system comprises one or more processors and a computer-readable medium storing instructions executable by the one or more processors to perform operations according to any of aspects 1 to 18.

In a twenty-fourth aspect a computer-readable medium stores instructions executable by the one or more processors to perform operations according to any of aspects 1 to 18.

In a twenty-fifth aspect according to any of aspects 1 to 18 the computer network includes a cloud computing environment.

Figure 1:
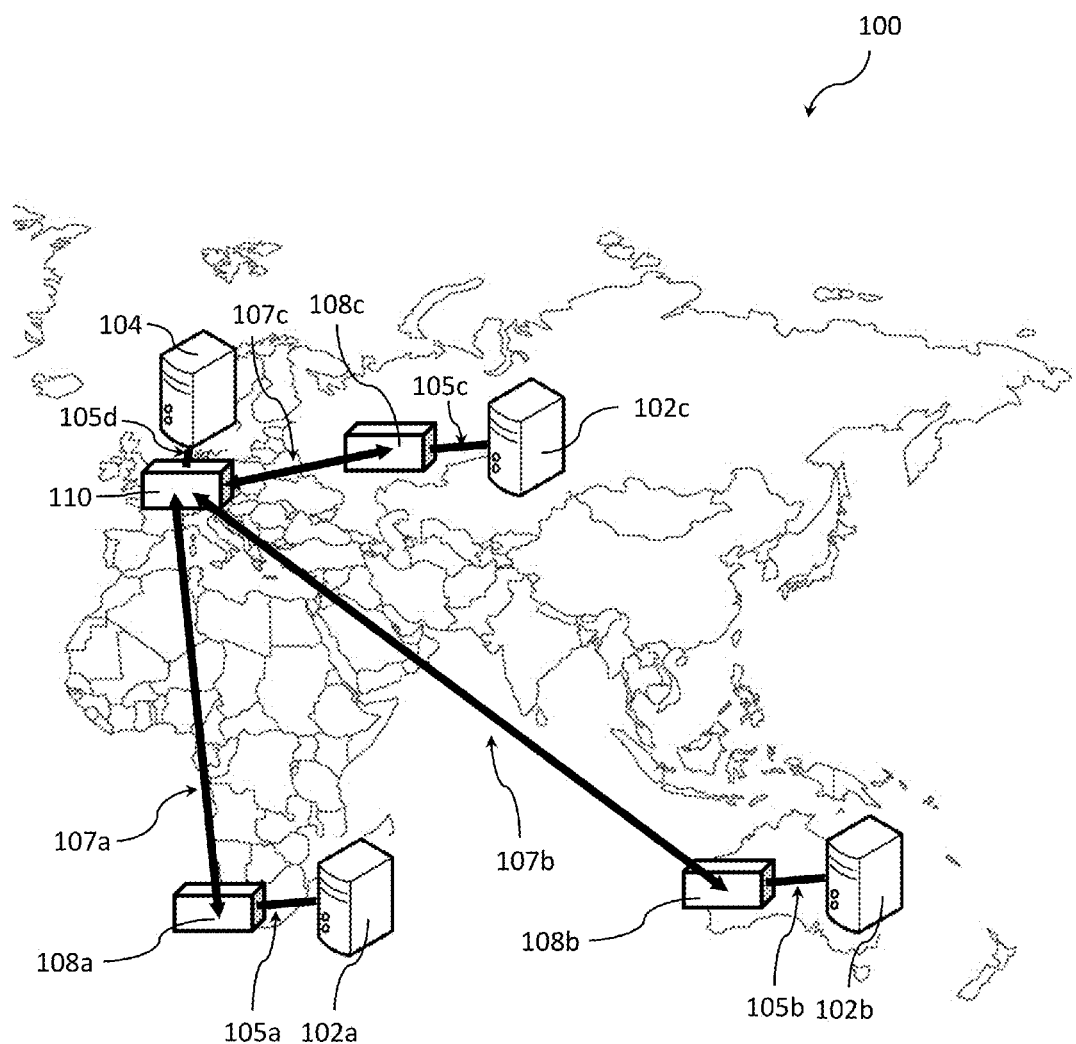
FIG. 1 illustrates an example client-server network.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DETAILED DESCRIPTION

This disclosure relates to synchronizing dictionaries of acceleration nodes in a computer network (e.g., a client-server network).

For example, dictionaries of a plurality of acceleration nodes of a client-server network can be synchronized to each include one or more identical data items and data identifier pairs. Synchronization can include transmitting a particular data item, or a combination of a data item and an associated data identifier, to another acceleration node which includes it in its dictionary. A particular acceleration node can, instead of transmitting a data item, transmit an associated data identifier to another acceleration node. As all (or a subset) of acceleration nodes can have an identical dictionary when employing the methods described herein, the particular acceleration node can use the same dictionary to communicate with all (or the subset of) other acceleration nodes of the computer network.

By implementing the techniques described here, the required memory at a network node (e.g., an acceleration node) of the computer network can be reduced by reducing a number of dictionaries that have to be stored at the network node to communicate with different other network nodes (e.g., acceleration nodes) and/or by reducing an amount of duplicated data ("data de-duplication") in the dictionaries of the network nodes. In some examples, a single dictionary per network node can be sufficient to handle communication in the computer network. In this manner, duplicated data can be removed from the dictionaries of the network nodes. In some examples, every data item to be transmitted over the computer network is only represented once in the dictionaries of the acceleration nodes. In addition, a processor load for a network node (e.g., an acceleration node) of the computer network for synchronizing a dictionary can be reduced. Also, network traffic in the computer network when updating dictionaries of one or more network nodes can be reduced and/or more evenly distributed in time. In particular, additional network traffic in peak times, where the amount of data transported across the computer network is highest, can be avoided. Moreover, network nodes (e.g., acceleration nodes) can "train themselves," i.e., the network nodes can self-update their dictionaries to contain certain data items before a predetermined transmission process utilizes the dictionary to provide a faster transmission between network nodes. Further, the network can dynamically synchronize dictionaries of the network nodes to adapt to different requirements during operation. Furthermore, additional network nodes (e.g., new acceleration nodes) can be added conveniently and flexibly as the dictionaries of the added network nodes can be added in a dynamic fashion. In addition, lost or partially lost dictionaries of particular network nodes can be restored as neighboring network nodes of the particular network nodes can have identical dictionaries.

FIG. 1 shows an example client-server network including multiple network nodes 102a, 102b, 102c, 104, 108a, 108b, 108c, 110. One or more of the nodes in the network can be acceleration nodes, each of which can accelerate transmission of resources between a client computer system and a server computer system. As described in detail below, an acceleration node can include a dictionary of data items and data identifiers. Each data identifier can identify a corresponding data item. In some implementations, an acceleration node can provide data identifiers to one or more of the other acceleration nodes. Alternatively, or in addition, an acceleration node can identify a data item based on data identifiers received from another acceleration node. In some implementations, a first acceleration node can receive a data item from a second acceleration node. The first acceleration node can include the data item in the first dictionary included in the first acceleration node. The first acceleration node can provide the received data item, a data identifier identifying the received data item, or both to a third acceleration node of the computer network. The first acceleration node can have determined the data identifier or obtained the data identifier from another acceleration node.

In the example of FIG. 1, the client-server network contains one or more servers 104 and multiple clients 102a, 102b, 102c in communication with the one or more servers 104. In some implementations, the server is a database server arranged to provide database services. The server 104 is connected to a server front-end node (SFE) 110 which is arranged to receive data from the server 104 to be transmitted to the clients 102a, 102b, 102c through client front ends (CFEs) 108a, 108b, 108c respectively and vice versa. The client front end nodes 108a, 108b, 108c and the server front-end nodes 110 can be configured to accelerate communication between the server 104 and the clients 102a, 102b, 102c. Thus, the client and server front end nodes are acceleration nodes of the client-server network. In some implementations, the network connection 105d between the server front-end node (SFE) 110 and the server 104 and the connections 105a, 105b, 105c between the client front-end nodes (CFEs) 108a, 108b, 108c respectively and their respective clients 102a, 102b, 102c includes a local area network connection. The server front-end node 110 and the client front-end nodes 108a, 108b, 108c are connected via wide area connections 107a, 107b, 107c respectively. The client front-end nodes 108a, 108b, 108c can also be mutually connected via network connections (e.g., local area network connections or wide area network connections).

In some implementations, a particular client 102b requests a service from the server 104. In the course of the execution of this request, data is transmitted between the server 104 and the client 102b. For instance, the request can be a request for the homepage of a website of a company. Serving a single request can include multiple data transmission cycles between the server 104 and the particular client 102b. In the example communication between the server 104 located in a first geographic location and the client 102b located in a second geographic location remote from the first geographic location over wide area network connection 107b, bandwidth limitations, latency and congestion can add up to a considerable delay in providing the requested services to the client. For example, it can take up to a minute or more in a typical client-server network to serve the request for the said homepage. The bottleneck for this communication can be, among others, transmitting data over the wide area connection between the server and the client.

In the system illustrated in FIG. 1, data transmitted between the server 104 and one of the clients 102a, 102b, 102c is routed through server front-end node 110 and at least one of the client front-end nodes 108a, 108b, 108c. In general, any network node implementing functions to accelerate communication between network nodes of a computer network is an acceleration node. Therefore, the methods and systems of the present disclosure are not limited to server and client frond end nodes but can also be applied to other acceleration nodes (and, as described below, also to general network nodes including dictionaries used for communication).

In order to accelerate communication between the server 104 and the clients 102a, 102b, 102c, the client front-end nodes 108a, 108b, 108c and server front-end nodes 110 can compress data before it is sent over the wide area network connections 107a, 107b, 107c. Alternatively or in addition, the client front-end nodes 108a, 108b, 108c and server front-end nodes 110 can reduce a number of communication roundtrips over the wide area network connections 107a, 107b, 107c required to execute a predetermined task. This can include caching data at the client front-end nodes 108a, 108b, 108c and server front-end node 110 to serve data from a local cache instead of from the original server (e.g., from a dictionary of the server 104). This can also include keeping network connections (e.g., transmission control protocol connections) open to avoid latency caused by re-opening network connections. In addition or alternatively, prioritizing services, caching of redundant traffic and reducing of packet loss by establishing multiple network connections in parallel can be employed to reduce delays.

The measures described above may include using dictionaries when transmitting data between the client front-end nodes 108a, 108b, 108c and server front-end node 110. A dictionary includes data items. In addition, a dictionary includes data identifiers associated with the data item identifying the data items. The data identifiers and the data items are referred to as "dictionary entries." The dictionary can also have additional dictionary entries. For example, if data identifiers and data items are not one-to-one matched and thus their relationship may be ambiguous (e.g., a data identifier is associated with two or more data items) additional dictionary entries for resolving this ambiguity can be provided. In other embodiments, an ambiguous data identifier can be transmitted in addition with a unique prefix of the data item associated with the data identifier. In this situation there might not be the need to store additional dictionary entries. In most examples, the data identifier uses less memory space than the data item it is associated with and identifies. However, in some examples the data identifier can also be longer than the data item it identifies (e.g., to add additional information or redundancy). In some implementations, the dictionary includes pairs of data identifiers and associated data items. In other examples, the dictionary can include multiple levels of data identifiers. Each network node of a computer network can have one more dictionaries.

The term "data item" includes any data associated with the network nodes of a computer network. For example, data to be transmitted over a network connection can be segmented into data items and stored (e.g., cached) in a database. In other examples, the data items can include resources from both sides of a network connection. The segmentation of data into data items can be executed according to any convenient segmentation algorithm. For example, data can be segmented based on its content. For instance, if a web page is to be segmented into data items, different images or other objects can be put in one separate data item each. However, the content can also be fragmented and stored in multiple data items. In other embodiments, a data item can be a series of bits that forms part of a resource. For instance, the resource can be a file. The data item can also be a series of bits that form part of a data packet or a buffer content. The same data item may occur in two or more different resources of the computer network (e.g., on different web pages or in different files). In other examples, the data is segmented into data items based on an order in which the data is going to be transmitted. A particular data item can appear in two or more different resources of the computer network (e.g., files, web sites). In this situation, the dictionary of a network node only has to include one dictionary entry including the data item. When transmitting the different resources including the identical data item, the network node can use the same data identifier.

A data identifier identifies an associated data item. In some examples, the data identifier can be determined from the data item in a deterministic manner. Some implementations of determining a data identifier includes determining a hash value of the data (or a portion of the data) of the data item. Employing data identifiers which can be determined in a deterministic manner is advantageous as for a given data item the associated data identifier can be determined independently at each network node by only knowing the data identifier generation function and applying it on the data item.

In communication between two network nodes (e.g., acceleration nodes), both involved network nodes can have the same (or at least partially the same) dictionary. When a data item included in the dictionaries of a transmitting and receiving network node arrives at the transmitting network node for transmittal, the transmitting network node looks up the associated data identifier in its dictionary. If the network node cannot find the data identifier, it can calculate it and store the newly calculated data identifier and the data item in its dictionary. Instead of transmitting the data item, the transmitting network node transmits the data identifier associated with the data item. The receiving network node, after having received the data identifier, can then look up the data item associated with the received data identifier. In examples where the data identifier is shorter than the data item it is associated with, this can reduce the amount of traffic which needs to pass through the network connection between the transmitting and receiving network node and thus reduce the response times for clients' requests. Thus, as described above, this technique can be employed in acceleration nodes of a computer network. In the example of FIG. 1 each of the client front-end nodes 108a, 108b, 108c and server front-end nodes 110 can have one or more dictionaries to communicate with one or more other client front-end nodes 108a, 108b, 108c and server front-end nodes 110.

The client front-end nodes 108a, 108b, 108c and server front-end nodes 110 can include a processing unit configured to receive and transmit data in a bidirectional fashion through the network node. The processing unit is adapted to employ any of the techniques for accelerating communication over the network described here. The dictionary can be stored in a volatile or persistent memory of any acceleration node in the network. In most examples, the dictionary will be stored in a volatile memory (e.g., a cache) to provide for a fast access to the dictionary.

Figure 2:
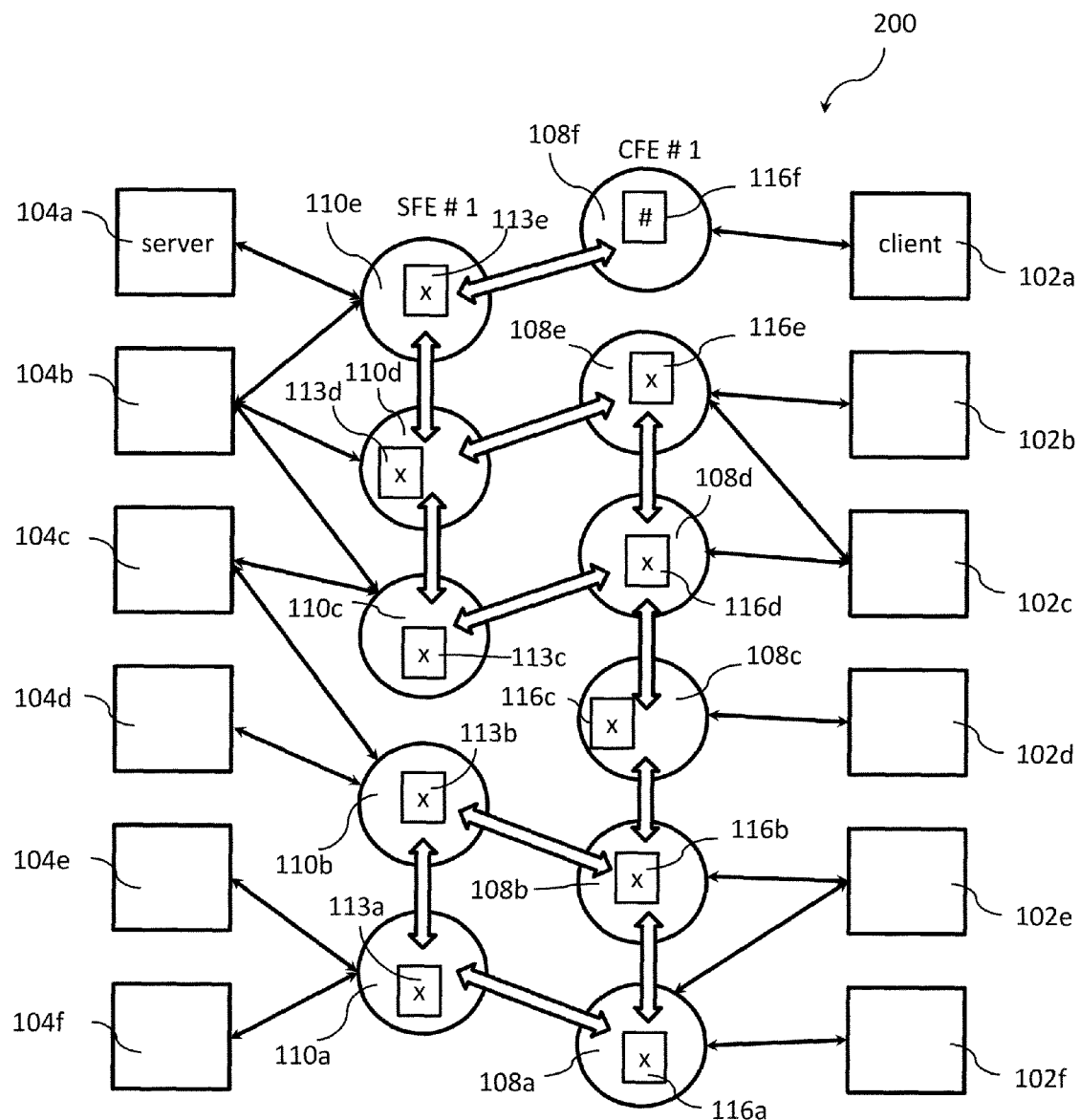
FIG. 2 illustrates an example client-server network including multiple servers, multiple clients, multiple server front-end nodes and multiple client front-end nodes at the beginning of a dictionary synchronization process.

A particular network node can be connected with multiple other network nodes. In addition, multiple other clients and servers can be part of the network also including client and server front-end nodes including network nodes. Furthermore, the server front-end nodes or the client front-end nodes can also be directly connected with each other. This can mean that a particular network node has to maintain different dictionaries to communicate with different connected network nodes. An example network topology is schematically illustrated in FIG. 2. In this example, server front-end network node 110d is connected with three other client or server front-end network nodes. Thus, server front-end network node 110d might need one separate dictionary for accelerating communication with each of the three client or server front-end network nodes it is directly connected to ("neighboring network nodes"). This can produce a considerable amount of dictionary data to be stored in the memory of the server front-end network node 110d.

Figure 5:
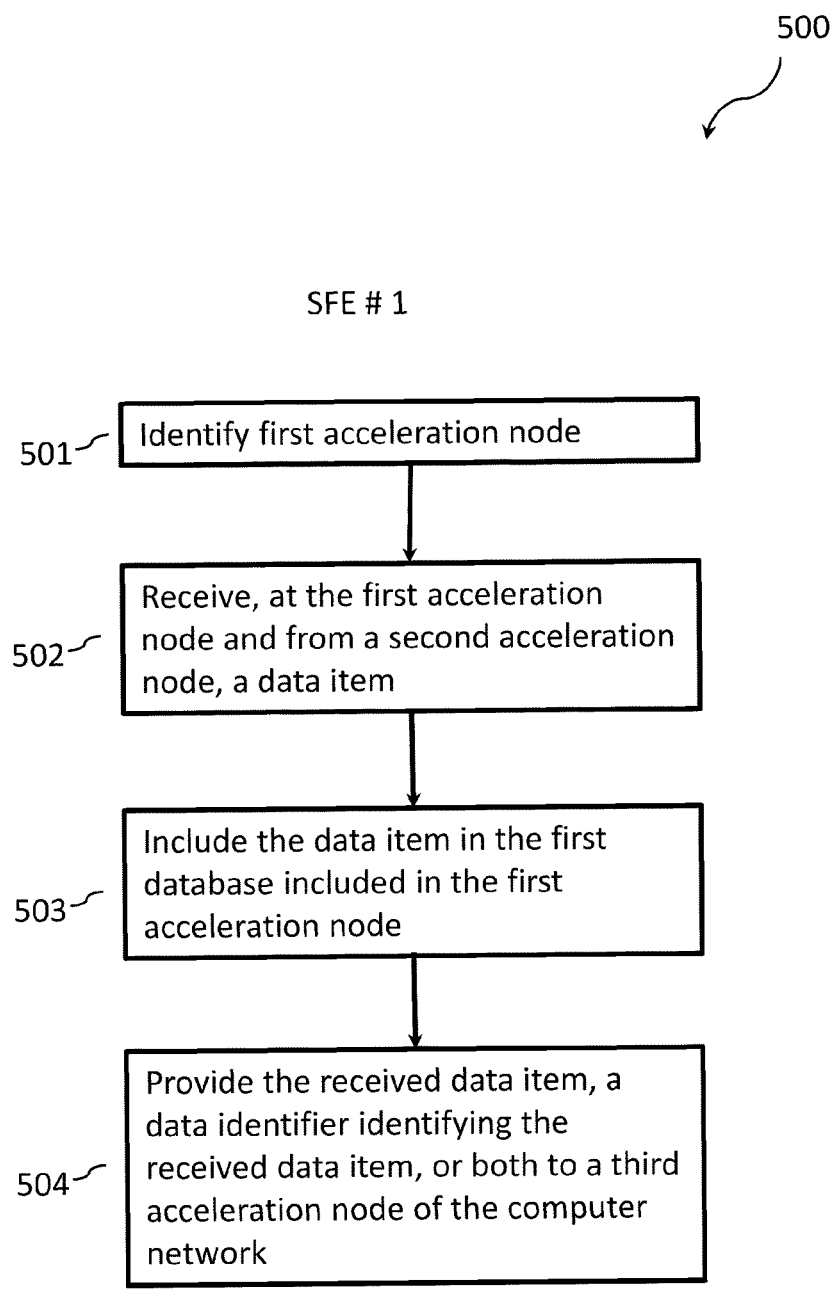
FIG. 5 illustrates another example method for synchronizing two dictionaries of acceleration nodes in a client-server network.

The present disclosure provides for a computer-implemented method as illustrated in FIG. 5, which, among other things, can decrease the amount of dictionary data to be stored in the memory of the server front-end network node 110d or any other network node. The method includes, at 501, identifying a first acceleration node included in a computer network comprising a plurality of acceleration nodes, an acceleration node to accelerate transmission of resources between a client computer system and a server computer system connected through one or more of the plurality of acceleration nodes, the first acceleration node including a first dictionary of data items and data identifiers, each data identifier identifying a corresponding data item, and wherein an acceleration node is configured to provide data identifiers to other acceleration nodes and to identify data items based on data identifiers received from another acceleration node, at 502, receiving, at the first acceleration node and from a second acceleration node, a data item, including, at 503, the data item in the first dictionary included in the first acceleration node and, at 504, providing the received data item, a data identifier identifying the received data item, or both to a third acceleration node of the computer network, the data identifier being either determined by the first acceleration node or obtained from another acceleration node.

Figure 3:
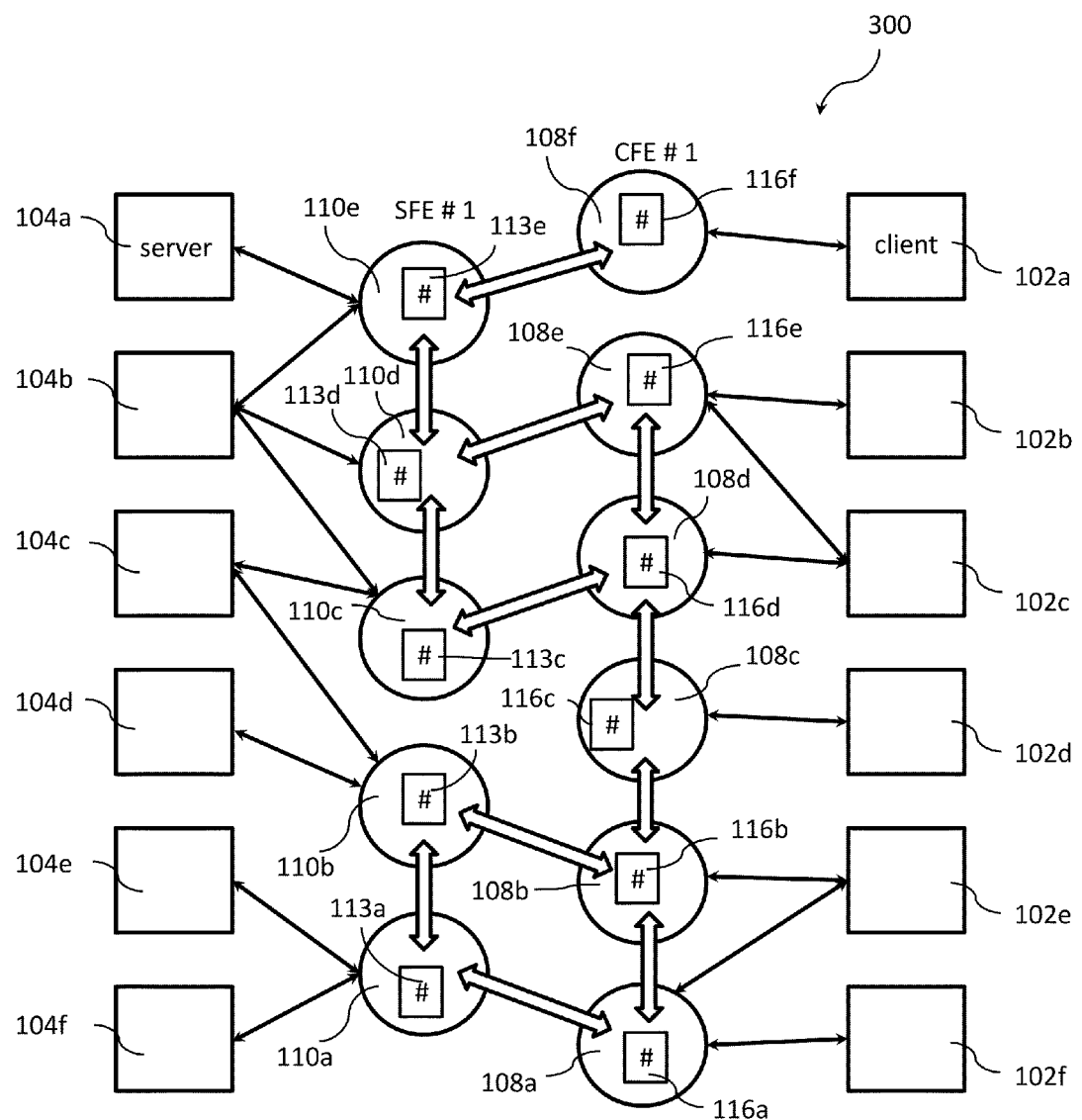
FIG. 3 illustrates the client-server network of FIG. 2 after the dictionary synchronization process has been completed.

FIG. 2 and FIG. 3 illustrate example computer implemented systems for synchronizing dictionaries of acceleration nodes in a computer network. The computer network of FIG. 2 and FIG. 3 is a client-server system having multiple servers 104a to 104f and multiple clients 102a and 102f. These servers 104a to 104f and clients 102a to 102f are connected via a network of client front-end network nodes 108a to 108f and server front-end network nodes 110a to 110e. Each client front-end network node 108a to 108f is connected to at least one server front-end network nodes 110a to 110e, for instance via a wide area network connection. FIG. 2 shows the client-server system in a first state where the dictionary of a particular network node 108f includes a particular pair of a data item and an associated data identifier (symbolized by "#" in FIG. 2). The remaining network nodes do not have this pair in their respective dictionaries (the missing or differing pair is symbolized by "x" in FIG. 2). At a predetermined point in time or upon a trigger event, the particular network node 108f transmits a dictionary entry (e.g., a data item or a combination of a data identifier and a data item) of its dictionary 116f for accelerating communication to a server front-end network node 110e. This network node 110e receives the dictionary entry and updates its dictionary 113e. In addition, server front-end network node 110e may transmit the dictionary entry to server front-end 110d. In some implementations, a dictionary entry can be transmitted as-is. Alternatively, or in addition, the network node can store and retrieve the dictionary entry or encrypt, compress or otherwise process it before transmission to a further server front-end network node 110d, which also updates its dictionary 113d. This network node can again forward the dictionary entry to more network nodes 108e, 110c and so on. After a predetermined number of transmission steps, the dictionary entry can have been propagated by the client and server front-end network nodes 108a to 108f and 110a to 110e throughout the complete network, and all dictionaries 113a to 113e and 116a to 116f can have been synchronized. This means that the dictionaries of all server and client front-end network nodes include the dictionary entry. As can be seen in FIG. 3, the dictionaries of all network nodes include the identical pair # of dictionary entries. Therefore, for accelerating any transmission between two client or server front-end network nodes of the data item of the common pair (e.g., from a client front-end network node to another client front-end network node, from a server front-end network node to another server front-end network node, from a client front-end network node to a server front-end network node, or vice versa), the same data identifier can be used. This process can be executed for any number of dictionary entries (e.g., data items). In this manner, a portion of all dictionaries of all acceleration nodes (e.g., client and server front-end network nodes) have corresponding (e.g. identical) dictionary entries. This can supersede the necessity to have multiple dictionaries or at least reduce the number of dictionaries required to communicate with multiple other network nodes. In turn, the memory requirements at the acceleration nodes (e.g., the client and server front-end network nodes 108a to 108f, 110a to 110e) decrease. In addition, an amount of duplicated data can be reduced as a particular data item can only be represented by a single data item/data identifier pair in the dictionaries of all acceleration nodes (e.g., the client and server front-end network nodes 108a to 108f and 110a to 110e). This also can reduce the amount of memory required at each acceleration node.

The dictionary synchronization method described in connection with FIG. 2 and FIG. 3 can be implemented in several different ways, which can also be used concurrently in the same computer network. In some implementations, a first acceleration node (e.g., client front-end network node 108f) transmits a predetermined data item to a second network node. The receiving acceleration node can then determine the data identifier from the received data item (e.g., by determining a hash value of the data item). Alternatively, the transmitting acceleration node can transmit the data identifier and the data item to the receiving acceleration node. Optionally, the acceleration nodes can determine if it is more resource efficient to transmit the data identifier and the associated data item or if is it more resource efficient to let the receiving acceleration node determine the data identifier associated with the transmitted data item after having received the data item. In some implementations, the acceleration nodes determine which option is faster (e.g., in view of the processing power and processor load of the receiving acceleration node and the available bandwidth of the network connection between the acceleration nodes). For example, due to a temporal high processor load of a processor of an acceleration node or due to one acceleration node having a processor with comparatively low processing power, it can be temporarily or permanently faster to transmit the data identifier from a neighboring acceleration node than to determine it locally at the acceleration node. In other examples, it can also be faster to determine the data identifier locally at an acceleration node instead of transmitting it over the network due to temporal or permanent bandwidth restrictions. In other embodiments, a first acceleration node can also send the data item to another acceleration node to determine the data identifier associated with the data item. After having determined the data identifier, the other acceleration node can transmit it to the first acceleration node. This can also be resource efficient (e.g. faster) in some situations other than the options describes above. Instead of using the processing speed to decide if a data identifier is transmitted or determined locally, the acceleration nodes can also use other criteria to decide if a data identifier is to be transmitted or determined locally. For example, in some examples network traffic should be as low as possible, so data identifiers are determined locally by the acceleration nodes. The criteria described above can also be used in combination or alternatingly (e.g., depending on the state of a computer network). The criteria described above can be selected by an administrator of the computer network. For instance, the administrator can decide that the network should be optimized to secure fast delivery of data over the network. Then, "resource efficient" means "time efficient". In other embodiments, the administrator can decide to minimize the traffic over the network. In this situation, "resource efficient" means "bandwidth efficient". A combination of different optimization criteria is also possible.

Figure 4:
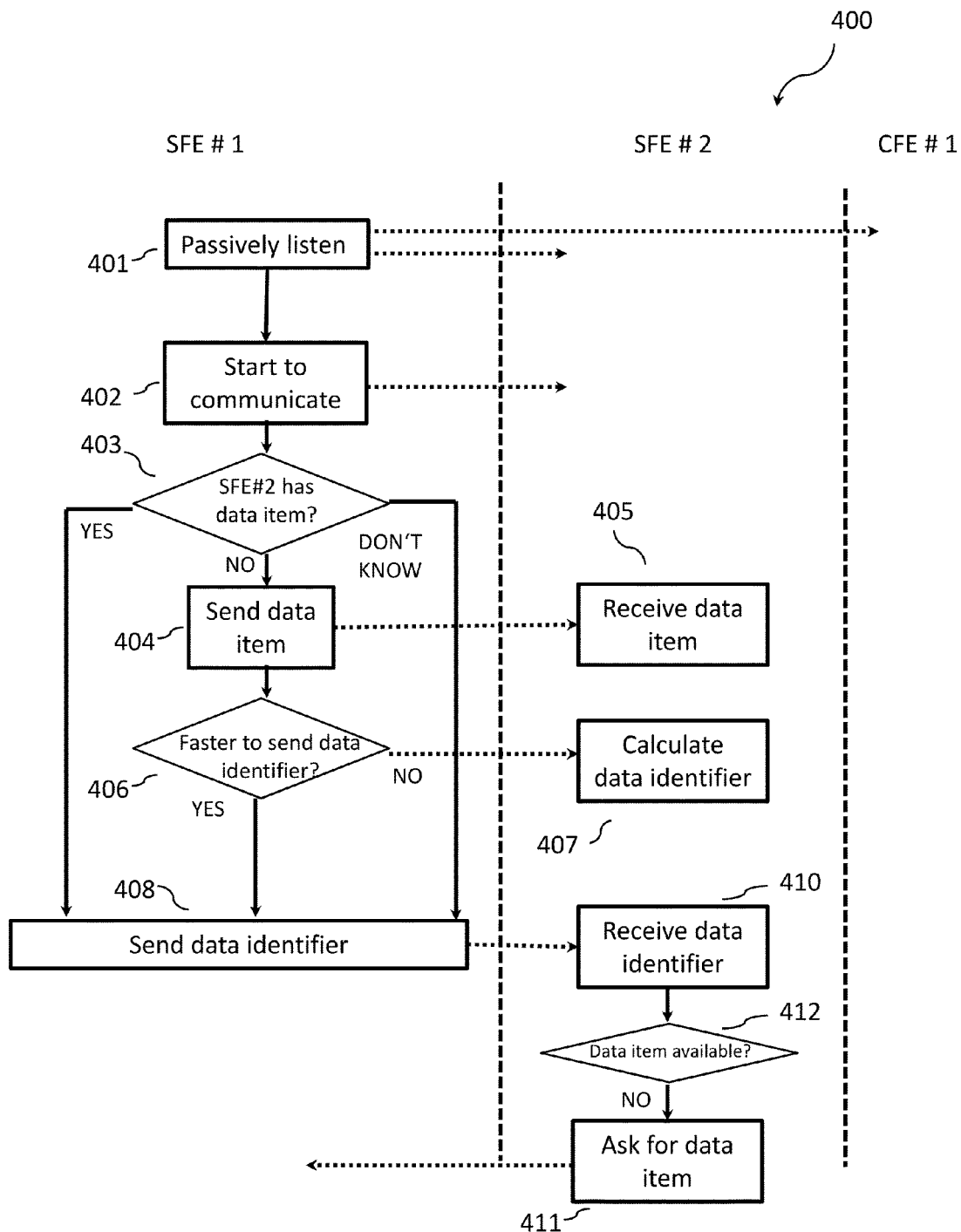
FIG. 4 illustrates an example method for synchronizing two dictionaries of acceleration nodes in a client-server network.

FIG. 4 illustrates another example dictionary synchronization method between two acceleration nodes of a computer network in the context of a communication process. At 401, a first acceleration node (e.g., the first server front-end node in FIG. 4) listens passively for transmissions (e.g., transmissions from the second server front-end network node and from the first client front-end network node in FIG. 4). At operation 402, the first acceleration node starts to communicate with a neighboring acceleration node (e.g., with the second server front-end network node in FIG. 4) to carry out a communication process across the network connection between the first network node and the neighboring network node. The following update operation can take place in several different ways. At operation 403, the first acceleration node can determine if the neighboring network node it is going to communicate with has a predetermined data item in its dictionary. For instance, the first acceleration node can use the information about the other acceleration node's dictionary gathered while passively listening to broadcasts of the neighboring acceleration nodes. Depending on the outcome of the determination operation, the first network acceleration node can select one of several operations. Firstly, at operation 408, if the first acceleration node has determined that the other acceleration node has the data item to be transmitted in its dictionary, the first acceleration node only transmits the data identifier associated with the data item. At 410, the other acceleration node receives the data identifier and can identify the associated data item in its dictionary, if the determination of the first acceleration node regarding its existence in the other network node's dictionary was correct. The other acceleration node determines at 412 if the data item associated with the received data identifier is in its dictionary. If the other acceleration node does not have the associated data item in its dictionary, it can ask at 411 the first acceleration node to transmit the data item. In a second alternative, the first acceleration node cannot determine if the data item is present in the other network node's dictionary. In this case, at operation 408, it can send the data identifier to the other acceleration node. If the other acceleration node does not have the associated data item in its dictionary, at operation 411, it can ask the first acceleration node to transmit it. Thus, in the example of FIG. 4 the dictionary of the second acceleration node is updated "on the fly," i.e., in connection with a communication process (e.g., a transmission of the data item from the first acceleration node to the second acceleration node) between the first and second acceleration nodes. For example, the data item can be part of a transmission of data between a server and a client (e.g., a web page served to the client).

Alternatively, if the first acceleration node cannot determine that the data item is present in the other acceleration node's dictionary, it can send the data item directly and the other acceleration node can determine the associated data identifier (e.g., by determining a hash value of the data item), or receive it from the first acceleration node as well. In a third alternative, the first acceleration node has determined that the data item is not present in the other acceleration node's dictionary. At operation 404, the first acceleration node transmits the data item. At operation 406, the first and/or the other acceleration node can determine if it would be more optimal to also send the data identifier associated with the data item or let the other acceleration node determine the data identifier associated to the received data item (as described above). Depending on the outcome of this determination operation, the first acceleration node can either, at operation 408, send the data identifier as well or, at operation 407, the other acceleration node can determine the data identifier associated with the received data item.

In other examples, the first acceleration node can first transmit a data identifier associated with a predetermined data item to a second acceleration node. The second acceleration node receives the data identifier and determines if the data item associated with the data identifier already exists in its dictionary. If this is the case, the second acceleration node can signal the transmitting acceleration node that a transmittal of the data item associated with the transmitted data identifier is not required. If the receiving acceleration nodes determine that the data item associated with the data identifier is not yet in its dictionary, the second acceleration node can poll the data item from the first acceleration node. Alternatively, the second acceleration node can also poll the data item from another acceleration node which has it in its dictionary. For instance, transmission from the other acceleration node can be faster as transmission from the first acceleration node (e.g., as the other acceleration node is closer to the second acceleration than the first acceleration node). After having received the poll, the first acceleration node also transmits the data item associated with the transmitted data identifier. The receiving acceleration node receives the data item and updates its dictionary to include the data item and the associated data identifier.

As described in connection with FIG. 4, a dictionary synchronization process can be triggered when a particular data item is to be transmitted through an acceleration node. In addition, or alternatively, the acceleration nodes can monitor network traffic to determine convenient times to carry out a dictionary synchronization process (e.g., the methods described in connection with FIG. 4 and FIG. 5). In one example, the acceleration nodes perform the synchronization operations during "off-peak times," e.g., when the volume of the network traffic (e.g., between the acceleration nodes involved in the process) is below a predetermined threshold. Alternatively or in addition, the acceleration nodes can monitor priorities of transmission processes that take place at a certain time at the involved acceleration nodes. In other examples, the synchronization process is scheduled to take place regularly, in particular periodically (e.g., once every day) or event-driven (e.g., after the resources stored at a predetermined acceleration node have been changed in a predetermined manner). The methods for triggering the update process can also be combined. For example, a periodic update can be combined with network traffic monitoring. In this manner, update processes can take place regularly but in the same time at off-peak times.

The dictionary synchronization methods described herein can be initiated locally by each acceleration node of the computer network, or they can be scheduled globally for all acceleration nodes of the computer network. A combination of both concepts is also possible. In one embodiment, an acceleration node initiates a synchronization operation while transmitting data to another acceleration node (e.g., as described in connection with FIG. 4). In other embodiments, a schedule for a dictionary synchronization process can be provided in the computer network. The schedule can include information that indicates which acceleration node periodically or event-driven updates the dictionaries of which neighboring acceleration nodes. In other examples, the dictionary synchronization process can be initiated by a particular acceleration node upon occurrence of a trigger event (e.g., network traffic below a predetermined threshold at the particular acceleration node or new/modified data available at the acceleration node). In this situation, multiple acceleration nodes in a computer network can initiate dictionary synchronization processes at the same time or at different times.

In the methods described herein, an acceleration node can keep track of the data items, the data identifiers, or both it transmits to or receives from neighboring acceleration nodes. In other examples, an acceleration node can listen to broadcasts of dictionary entries of other acceleration nodes. For example, an acceleration node can store which data items or which data identifiers (or both) have been transmitted to a particular neighboring acceleration node. Likewise, the acceleration node can store which data items or which data identifiers (or both) have been received from a particular neighboring acceleration node, be it via point-to-point communication or via a broadcast. In addition or alternatively, an acceleration node can communicate (e.g., via broadcast or point-to-point communication) that it has deleted or is going to delete a particular data item from its dictionary. In addition or alternatively, an acceleration node can communicate (e.g., via broadcast or point-to-point communication) that it has detected a collision in a function generating the data identifiers (e.g., two different data items resulting in the same data identifier). This information can be used by the acceleration nodes to coordinate data item and data identifier transmission operations in a dictionary synchronization process. For instance, the first acceleration node can refrain from transmitting a data identifier or a data item to a predetermined other acceleration node for a predetermined time after having sent the data identifier or data item. Alternatively or in addition, the first acceleration node can refrain from sending a data identifier or a data item obtained from a predetermined other acceleration node for a predetermined time after having obtained the data identifier or data item. Alternatively or in addition, the first acceleration node can determine which dictionary entries are missing in the dictionary of one or more neighboring acceleration nodes.

In other examples, the acceleration nodes can regularly broadcast dictionary entries (for examples, an acceleration node can broadcast which dictionary entries it is familiar with) to neighboring acceleration nodes, whether by broadcasting the data item or broadcasting the data identifier or both. The acceleration nodes can identify which dictionary entries their neighboring acceleration nodes are familiar with and which dictionary entries of their own dictionaries are unknown to the neighboring acceleration nodes. Then, an acceleration node having a dictionary entry not in the dictionary of one or more neighboring acceleration nodes can broadcast the dictionary entry or transmit it via point-to-point communication to the acceleration nodes lacking the dictionary entry. In other examples, an acceleration node can determine that a dictionary entry broadcast by another network node is missing in its dictionary and update its dictionary (e.g., by asking the other acceleration node to transmit a dictionary entry, or by calculating its data identifier on its own assuming the broadcast included the data item). In some examples, an acceleration node broadcasts only the data identifiers of its dictionary to keep the amount of data transmitted as low as possible. By employing the methods described in the present paragraph, the "more knowledgeable" acceleration nodes can "teach" the "less knowledgeable" acceleration nodes.

As described above, every acceleration node in a network (or a portion of a network) can have only a single dictionary when using the dictionary synchronization methods described herein. However, in some examples only selected acceleration nodes of a network employ the dictionary synchronization methods described herein and communicate using the synchronized dictionaries between each other. Additionally, these acceleration nodes can have one or more additional dictionaries for communication with other acceleration nodes. For instance, groups of acceleration nodes can be clustered in regional clusters (e.g. based on their location), where one or more acceleration nodes of each cluster directly communicate with corresponding acceleration nodes of other clusters. The remaining acceleration nodes only communicate directly with acceleration nodes within their regional cluster. In this system, the dictionary synchronization processes described herein can be employed to synchronize only the dictionaries for inter-cluster communication. For communication within one cluster, the acceleration nodes can use other dictionaries. Optionally, acceleration nodes of a particular cluster of acceleration nodes can have a second dictionary that is also synchronized using the methods described herein for intra-cluster communication.

As described above, the data items to be included in the dictionary can be any data stored at the transmitting acceleration node or any resource of a network node (e.g., a resource of the server or of the client). By using the dictionary synchronization methods described herein, the dictionaries of all or of a sub-set of acceleration nodes can also be populated with data items before the actual data items are used in a service request of the client-server network. For example, a first acceleration node can modify a particular data item in its dictionary to generate a new data item not yet in its dictionary.

Additionally or alternatively, a first acceleration node can generate a random data item (e.g., by concatenation of random bits). In this manner, the acceleration node can "invent" new data items and "prophylactically" prepare itself or other acceleration nodes for transmitting these data items (or their associated data identifiers). The first acceleration node can transmit a newly generated data item to neighboring acceleration nodes as described above. For instance, the first acceleration node can transmit the data item and an associated data identifier, or only the data item. In this manner, dictionaries of the first and other acceleration nodes can be populated with dictionary entries at low-peak times, which can accelerate communication in times of high network traffic volume.

The methods described herein can also be used to populate the dictionaries of acceleration nodes added to a computer network. In general, acceleration nodes can be added to a computer network with a pre-installed dictionary, or with no pre-installed dictionary. Other acceleration nodes having a populated dictionary can transmit (e.g., broadcast) dictionary entries to the newly added acceleration node. In this manner, the dictionary of the newly added acceleration node is built or dictionary entries of a pre-installed dictionary can be updated and synchronized with the existing dictionaries of other acceleration nodes in the computer network. Thus, the methods described herein can provide for a dynamic and flexible dictionary synchronization process in which new nodes can be easily integrated in an existing computer network. The methods described herein can also be used to back-up the dictionary of one or more acceleration nodes in the computer network. For example, if a particular acceleration node loses part of its dictionary or its complete dictionary (e.g., an in-memory dictionary), the neighboring acceleration nodes can populate the particular acceleration node's dictionary by the dictionary synchronization operations described herein.

The methods described herein can also be used by a particular acceleration node to validate its dictionary. For instance, all acceleration nodes in a particular computer network (or a portion of a network) can be synchronized to have identical dictionaries. At a certain point in time, a particular acceleration node can check the validity of its dictionary by comparing data items and/or data identifiers obtained from or monitored in other acceleration nodes with its own dictionary. If there is a discrepancy, the particular acceleration node can determine that its dictionary is (at least partially) invalid. Optionally, the acceleration node can request dictionary entries from other acceleration nodes to replace the invalid dictionary entries. This provides for a built-in error checking operation.

The methods described herein relate to dictionary synchronization of network nodes connected in a network to include identical or corresponding dictionary entries. In some example, the dictionaries of all acceleration nodes or a sub-group of three or more acceleration nodes in a computer network include identical dictionary entries. In other examples, only a portion of the dictionary of each acceleration node is synchronized using the methods as described herein. In other examples, the different acceleration nodes can dynamically delete or rearrange their dictionaries (or parts of their dictionaries). For example, a dictionary of a particular acceleration node can have a predetermined maximum size. As long as the current dictionary is smaller than this maximum size, the acceleration node can add dictionary entries to its dictionary. However, as soon as the dictionary size reaches the maximum size, the network node can delete dictionary entries as soon as a new dictionary entry is received during a synchronization operation. The dictionary entries to be deleted can be selected based on one or more of multiple criteria. For instance, the least popular dictionary entry can be deleted from the dictionary. The popularity of a dictionary entry can be measured by its use frequency in communication in the overall network or at the particular acceleration node. In other examples, a dictionary entry which has not been used for the longest time (recency) in communication can be deleted from the dictionary. A combination of popularity and recency can also be used by the acceleration nodes to select a dictionary entry to be deleted. In other examples, acceleration nodes can decide not to include dictionary entries relating to data items that do not meet one or more predetermined criteria even if their maximum dictionary size has not yet been reached. In this fashion, the acceleration nodes can secure that their dictionaries do not grow excessively (after all, dictionaries are often stored in-memory to be quickly available) and that their respective dictionaries are tailored to the data transmitted over the particular acceleration node. For instance, a first acceleration node may seldom or never transmit a first resource that is transmitted frequently by a second acceleration node in a predetermined period of time. In this situation, the first acceleration node does not include data items of this resource in its dictionary. However, as described above, a data item can be associated with multiple resources. Therefore, even though the first acceleration node might not transmit the first resource, it can nevertheless have the data item in its dictionary. On the other hand, the second acceleration node can have one or more entries including data items of the resource in its dictionary.

Two identical data items in two dictionaries can encode the same content (e.g., a picture in a web page to be served). However, that does not mean that the dictionary entries have to be stored in an identical format or manner in the memories of the different network nodes. Likewise, if herein it is described that dictionary entries are obtained, transmitted or received, that refers to the content of the dictionary entry (e.g., a particular data item or data identifier). The dictionary entries can be processed (e.g., encoded, decoded or compressed) for transmission in different ways and still include identical content. Moreover, if a dictionary entry is obtained, stored and then transmitted or transmitted multiple times, this again refers to the content and not to the particular data piece encoding the content.

Above client-server networks have been described. Client-server networks are particular computer networks. A computer network includes a plurality of network nodes communicating via network connections. However, the methods and systems described herein can be equally applied in other computer networks including multiple network nodes using dictionaries of any form including data items and data identifiers as described above for communication between the network nodes. Moreover, above communication between acceleration nodes of a client-server network is described. An acceleration node is a particular network node whose attributes are described above. The methods and systems described herein can be equally applied to other network nodes besides acceleration nodes. For example, the methods and systems described herein can be applied to server or client nodes or to network nodes having other functions.

Even though different components of the system 100 of FIG. 1 are symbolized using symbols for physical devices, FIG. 1 depicts a view of the functional units of the computer network. These functional units can be embodied in many different hardware configurations. For instance, each functional unit can be hosted on a dedicated device. Alternatively, multiple functional units can be hosted on the same host device, or any mixture of the two (or more). Further details regarding possible hardware implementations of the functional units are described below. The same is true for the computer networks depicted in FIG. 2 and FIG. 3.

In one embodiment, the computer networks described herein include a cloud computing environment (e.g., some or all of the server-side network nodes in the client-server networks of FIG. 1, FIG. 2 and FIG. 3 can be included in a cloud computing environment). Then, the functional units can be distributed over multiple computer systems. For instance, network nodes (e.g., acceleration nodes) using the dictionary synchronization methods described herein can be part of the cloud computing environment (i.e., an environment for distributed computing over a network including the network nodes). In one embodiment, a client can request a service and this service is (at least partially) processed by network nodes of a cloud computing environment. In these embodiments, the synchronized dictionaries can be used to accelerate communication between different network nodes of the cloud computing environment.

At a high level, the clients, servers and network nodes (e.g., acceleration nodes) are associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations, e.g. in a manner that the operations are distributed among the two or more processors. The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, Unix-based workstation, or any other suitable device. In other words, the present disclosure contemplates computers other than general purpose computers, as well as computers without conventional operating systems. Further, the computer, processor and server may be adapted to execute any operating system, including Linux, Unix, Windows, Mac OS, iOS, Android or any other suitable operating system.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIG. 1 and FIG. 2 and thereby exploit recent innovations in hardware to run a database in main memory. In an implementation of the present disclosure described herein, the servers may be types of a Java development platform, e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two or more different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and/or R, Perl, any suitable version of 4GL, as well as others.

The figures and accompanying descriptions illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, USB drives, flash drivers, removable storage devices (e.g. SD cards) or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural form to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons", some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as removing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or processor may be a processor for performing actions in accordance with instructions and one or more memory devices for storing instructions and data. Generally, a computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display), LED (light emitting diode) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or processor can interact with a user by sending documents to and receiving documents from a device that is used by the user; for example, by sending web pages to a web browser on a user device in response to requests received from the web browser.

Implementations of the subject-matter described in this specification can be implemented in a computing system that includes a back end component, e.g., as a server, or that includes a middleware component, e.g., an application server, or that includes a front-end component, e.g., a user computer having a graphical user interface or a web browser through which a user can interact with an implementation of the subject-matter described in this specification, or any combination of one or more such back end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   identifying a first acceleration node included in a computer network comprising a plurality of acceleration nodes, an acceleration node to accelerate transmission of resources between a client computer system and a server computer system connected through one or more of the plurality of acceleration nodes, the first acceleration node including a first dictionary of data items and data identifiers, each data identifier identifying a corresponding data item, and wherein an acceleration node is configured to provide data identifiers to other acceleration nodes and to identify data items based on data identifiers received from another acceleration node;
   receiving, at the first acceleration node and from a second acceleration node, a data item;
   including the data item in the first dictionary included in the first acceleration node; and
   providing the received data item, a data identifier identifying the received data item, or both to a third acceleration node of the computer network, wherein the data identifier is either determined by the first acceleration node or obtained from another acceleration node.

2. The method of claim 1, further comprising:
   receiving, at the first acceleration node and from one or more further acceleration nodes, further data items; and
   including the further data items in the first dictionary.

3. The method of claim 1, further comprising determining the data identifier for a corresponding data item using a predetermined algorithm wherein the predetermined algorithm comprises determining a hash value.

4. The method of claim 1, wherein the first acceleration node stores a protocol of dictionary entries including data items, data identifiers, or both in a second dictionary of the third acceleration node.

5. The method of claim 1 further comprising:
   determining at the first acceleration node which dictionary entries of the first dictionary are missing in the second dictionary; and
   providing from the first acceleration node the missing dictionary entries.

6. The method of claim 1, further comprising:
   determining that a dictionary of the third acceleration node contains the data item;
   providing a data identifier identifying the received data item to the third acceleration node if it has been determined that the dictionary of the third acceleration node contains the data item; and
   providing the data item to the third acceleration node if it has been determined that the dictionary of the third acceleration node does not contain the data item.

7. The method of claim 1, further comprising:
   estimating an amount of resources and/or time it takes for the third acceleration node to determine the data identifier identifying the received data item and an amount of resources and/or time it takes to transmit the data identifier from the first acceleration node to the third acceleration node;
   comparing the amount of resources and/or time it takes for the third acceleration node to determine the data identifier identifying the received data item and the amount of resources and/or time it takes to transmit the data identifier from the first acceleration node to the third acceleration node;
   transmitting the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node; and
   letting the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

8. The method of claim 1 wherein a data identifier is provided by the first acceleration node, further comprising:
   receiving a data identifier of the first dictionary at the third acceleration node;
   determining that a dictionary of the third acceleration node does not include the data identifier;
   requesting, from the first acceleration node, the data item identified by the data identifier;
   transmitting the data item from the first acceleration node to the third acceleration node; and including the received data identifier and the received data item in the dictionary of the third acceleration.

9. The method of claim 1, wherein the first acceleration node regularly broadcasts at least a portion of its dictionary to one or more neighboring acceleration nodes including the third acceleration node.

10. The method of claim 1, wherein the data item is a resource to be transmitted via the first acceleration node across the computer network.

11. The method of claim 1, further comprising:
comparing network traffic at an acceleration node of the plurality of acceleration nodes with a predetermined threshold;
determining that the network traffic at the acceleration node of the computer network is below the predetermined threshold; and
providing the received data item, a data identifier identifying the received data item, or both to the third acceleration node of the computer network in response to determining that the network traffic at the acceleration node of the computer network is below the predetermined threshold.

12. The method of claim 1, further comprising:
generating at the first acceleration node a data item to be included in the dictionary of the first acceleration node;
determining a data identifier identifying the generated data item; and
transmitting the generated data item or a combination of the generated data item and the calculated data identifier to the third acceleration node.

13. The method of claim 1, further comprising:
determining, by the first acceleration node, a number of times a predetermined data identifier is used in communication with other acceleration nodes in a predetermined period of time;
comparing the number of times with a threshold number of times; and
deleting a data item identified by the data identifier from the dictionary upon determining that the number of times is less than the threshold number of times.

14. The method of claim 1, wherein the client-server network includes at least three different subsets of the plurality of acceleration nodes each subset including at least one acceleration node, wherein the first acceleration node is included in the first subset, the second acceleration node is included in the second subset, and the third acceleration node is included in a third subset of acceleration nodes,
wherein the first acceleration node includes at least one additional dictionary, and the method further comprising:
providing a data identifier of the additional dictionary to another acceleration node of the first subset of acceleration nodes to identify a data item based on the data identifier of the additional dictionary.

15. The method of claim 1, further comprising:
regularly synchronizing all dictionaries of all acceleration nodes of the computer network or a subset of acceleration nodes of the computer network,
wherein after synchronization has been completed all dictionaries of the acceleration nodes of the computer network at least partially include identical dictionary entries.

16. The method of claim 1, further comprising:
adding the third acceleration node to the computer network without a populated dictionary; or
in which a second dictionary of the third acceleration node has been partially or completely lost; and
building or recovering the second dictionary of the third acceleration node by receiving data from other acceleration nodes of the computer network.

17. The method of claim 1, wherein the data item received by the first network node as part of a communication process between a server and a client.

18. The method of claim 1, wherein the computer network includes a cloud computing environment.

19. A system comprising:
one or more processors; and
a non-transitory computer-readable medium storing instructions executable by the one or more processors to perform operations comprising:
identifying a first acceleration node included in a computer network comprising two or more acceleration nodes, an acceleration node to accelerate transmission of resources between a client computer system and a server computer system connected through the acceleration node, the first acceleration node including a first dictionary of data items and data identifiers, each data identifier identifying a corresponding data item, and wherein an acceleration node is configured to provide data identifiers to other acceleration nodes and to identify a data item based on a data identifier received from another acceleration node;
receiving, at the first acceleration node and from a second acceleration node, a data item;
including the data item in the first dictionary; and
providing the received data item, a data identifier identifying the received data item, or both to a third acceleration node of the computer network, wherein the data identifier is determined at the first acceleration node or obtained from another acceleration node.

20. The system of claim 19, wherein the computer-readable medium further stores instructions executable by the one or more processors to perform operations comprising:
estimating an amount of resources and/or time it takes for the third acceleration node to determine the data identifier identifying the received data item and an amount of resources and/or time it takes to transmit the data identifier from the first acceleration node to the third acceleration node;
comparing the amount of resources and/or time it takes for the third acceleration node to determine the data identifier identifying the received data item and the amount of resources and/or time it takes to transmit the data identifier from the first acceleration node to the third acceleration node;
transmitting the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node; and
letting the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

21. A non-transitory computer readable medium storing instructions thereon which when executed by a processor cause the processor to:

identify a first acceleration node included in a computer network comprising two or more acceleration nodes, an acceleration node to accelerate transmission of resources between a client computer system and a server computer system connected through the acceleration node, the first acceleration node including a first dictionary of data items and data identifiers, each data identifier identifying a corresponding data item, and wherein an acceleration node is configured to provide data identifiers to other acceleration nodes and to identify a data item based on a data identifier received from another acceleration node;

receive, at the first acceleration node and from a second acceleration node, a data item;

include the data item in the first dictionary; and provide the received data item, a data identifier identifying the received data item, or both to a third acceleration node of the computer network, wherein the data identifier is determined at the first acceleration node or obtained from another acceleration node.

22. The computer readable medium of claim 20 further storing instructions which when executed by a processor cause the processor to:

estimate an amount of resources and/or time it takes for the third acceleration node to determine the data identifier identifying the received data item and an amount of resources and/or time it takes to transmit the data identifier from the first acceleration node to the third acceleration node;

compare the amount of resources and/or time it takes for the third acceleration node to determine the data identifier identifying the received data item and the amount of resources and/or time it takes to transmit the data identifier from the first acceleration node to the third acceleration node;

transmit the data identifier identifying the received data item from the first acceleration node to the third network node if the amount of resources and/or time it takes for the third acceleration node to determine the data identifier identifying the received data item is larger than the amount of resources and/or time it takes to transmit the data identifier from the first acceleration node to the third acceleration node; and let the third network node calculate the data identifier if the amount of resources and/or time it takes for the third acceleration node to determine the data identifier identifying the received data item is smaller than the amount of resources and/or time it takes to transmit the data identifier from the first acceleration node to the third acceleration node.

* * * * *